E. P. DOYLE.
COUPLING DEVICE FOR VEHICLES.
APPLICATION FILED AUG. 21, 1912.
1,208,929.
Patented Dec. 19, 1916.
6 SHEETS—SHEET 1.
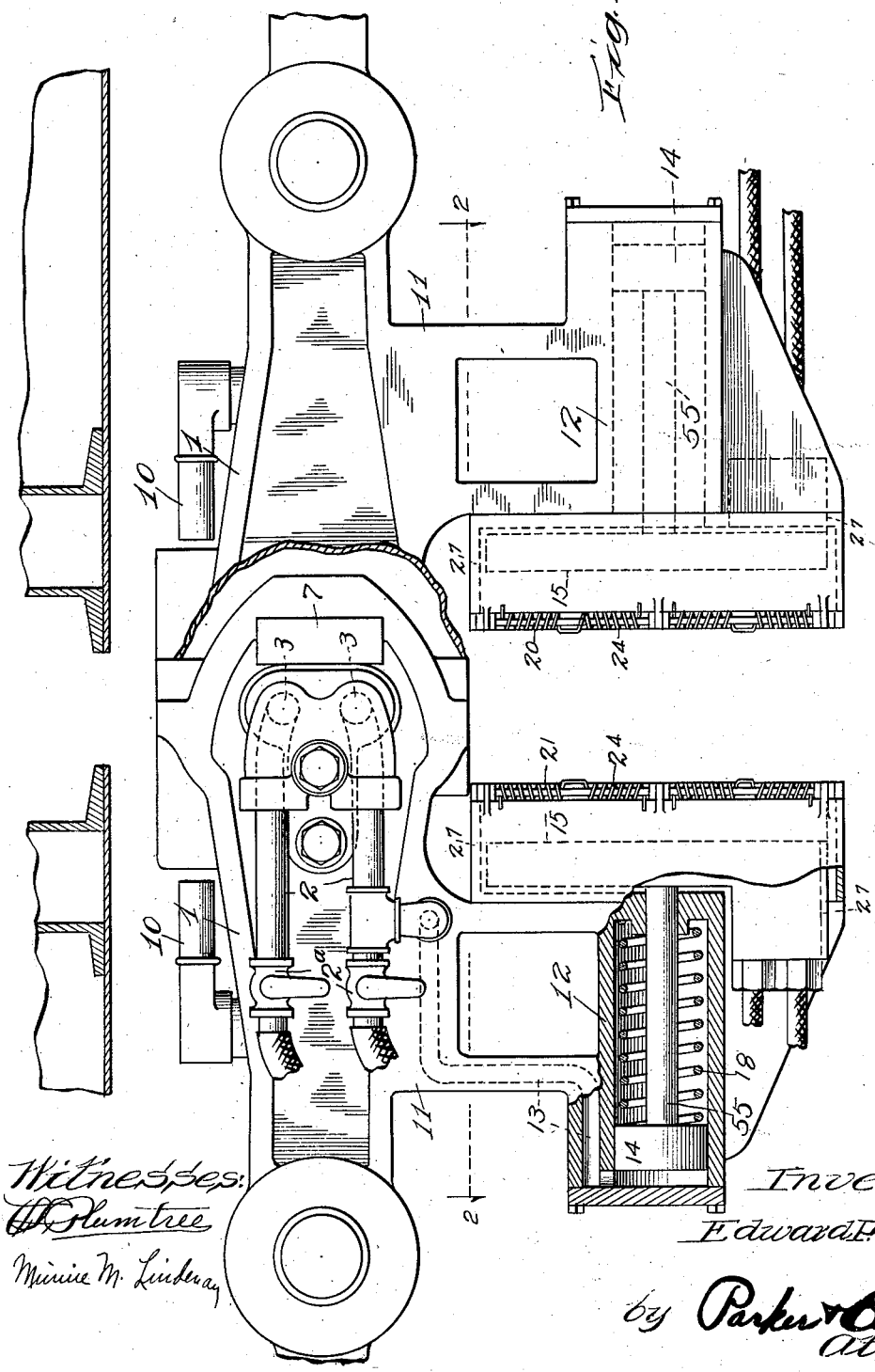

E. P. DOYLE.
COUPLING DEVICE FOR VEHICLES.
APPLICATION FILED AUG. 21, 1912.
1,208,929.
Patented Dec. 19, 1916.
6 SHEETS—SHEET 2.
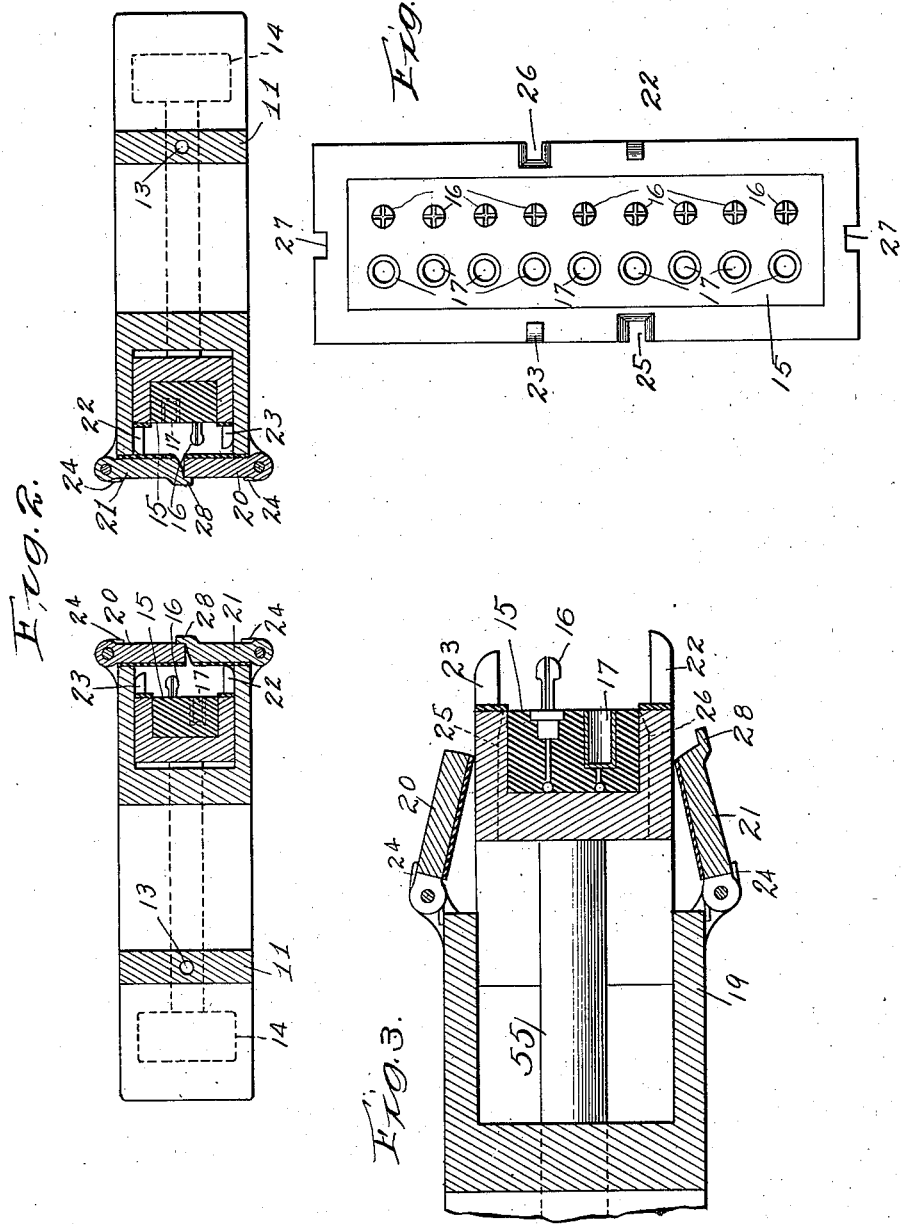

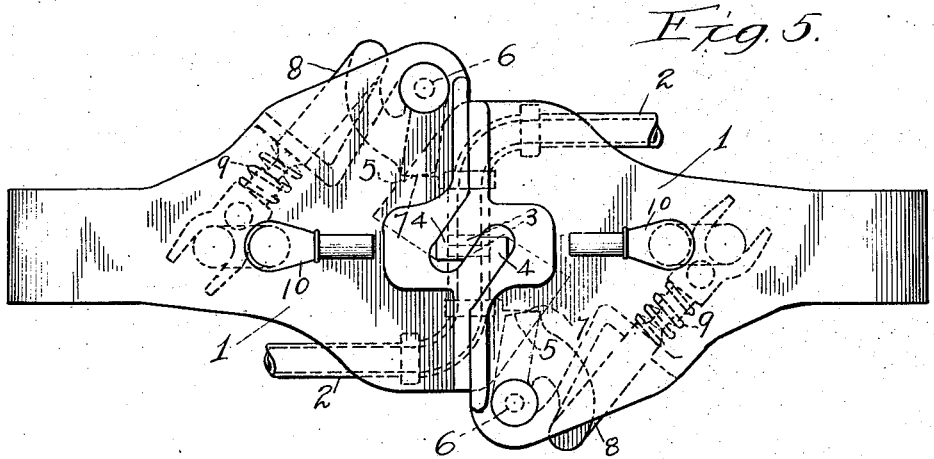
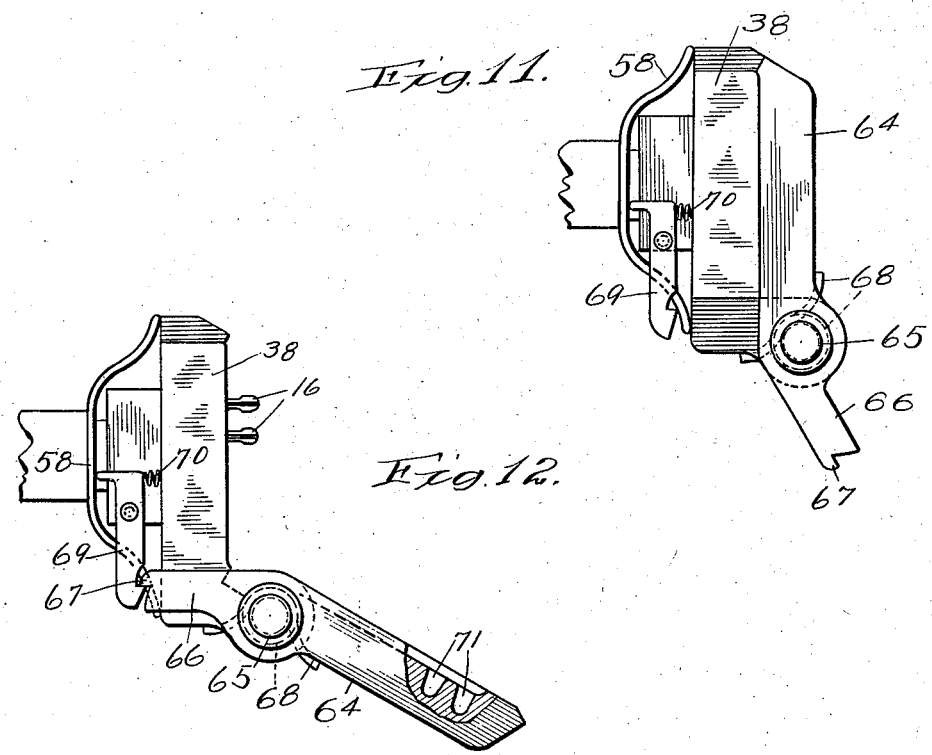

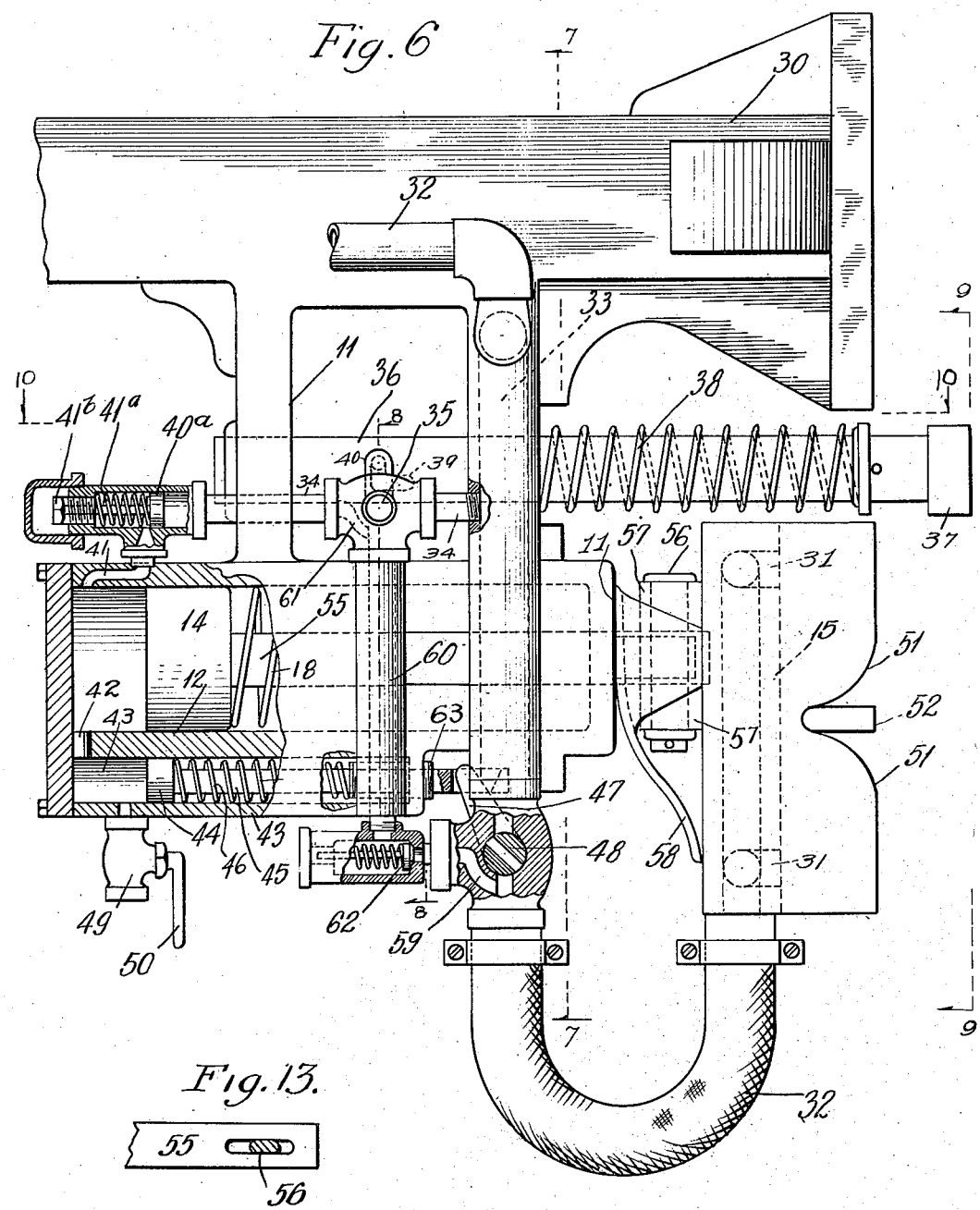

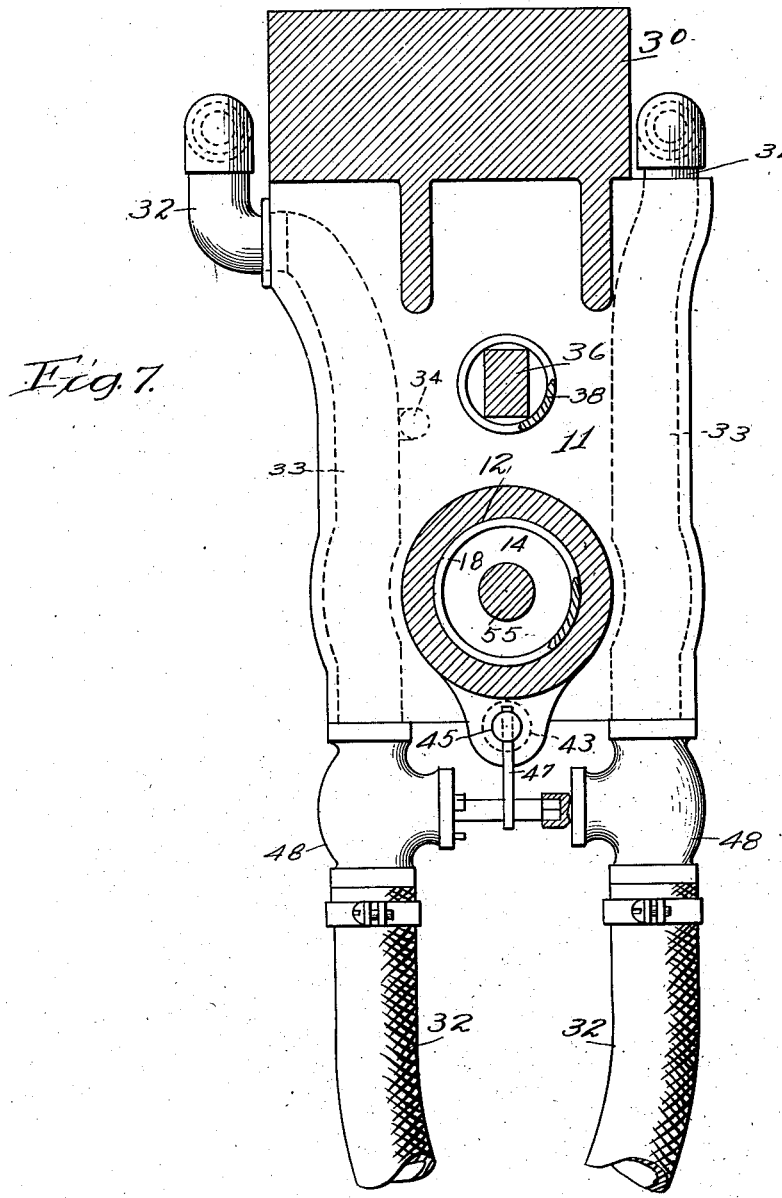

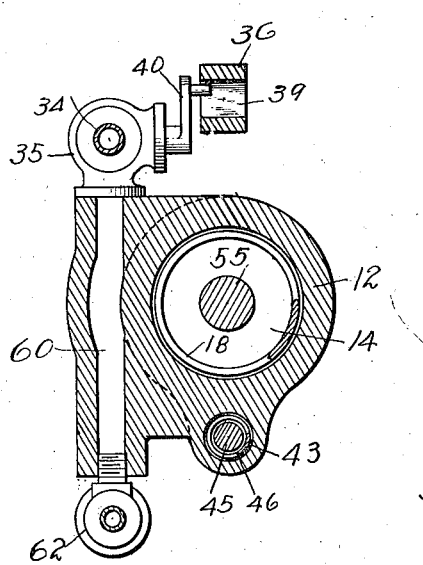
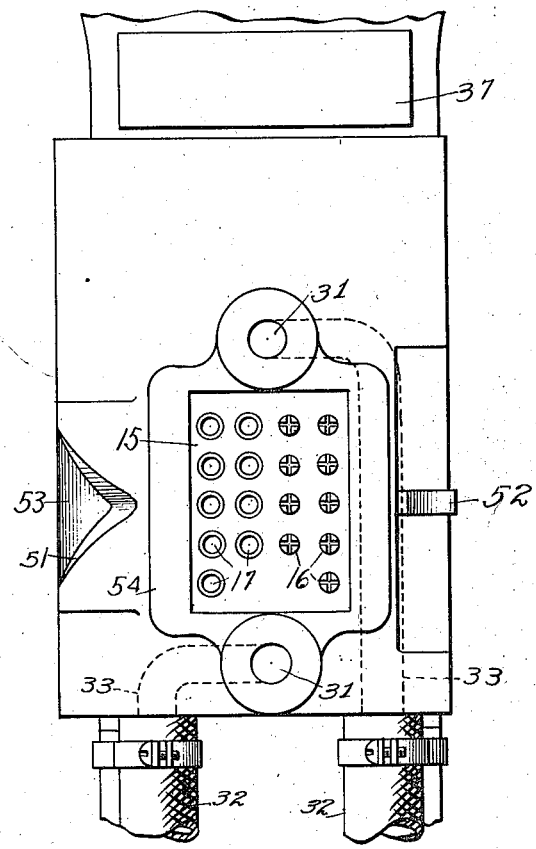
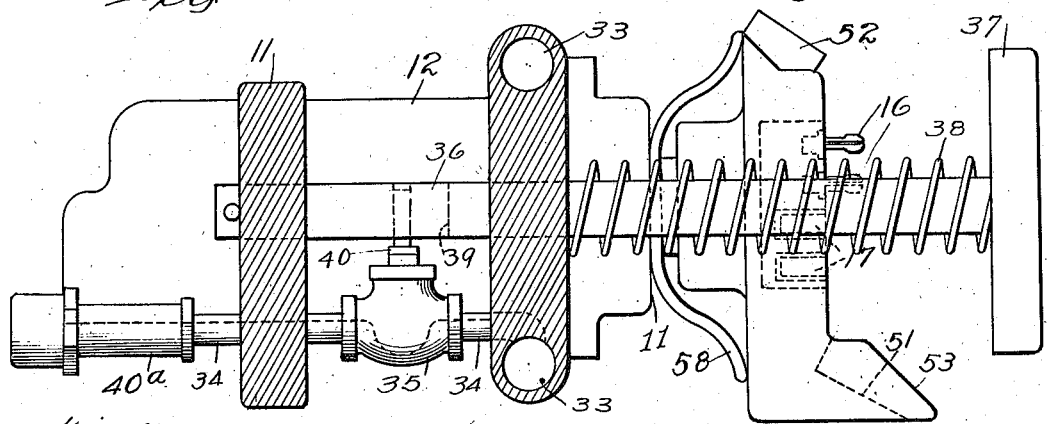

UNITED STATES PATENT OFFICE.

EDWARD P. DOYLE, OF WHEATON, ILLINOIS, ASSIGNOR, BY DIRECT AND MESNE ASSIGNMENTS, TO WILLIAM T. VAN DORN, OF CHICAGO, ILLINOIS.

COUPLING DEVICE FOR VEHICLES.

1,208,929.

Specification of Letters Patent.   Patented Dec. 19, 1916.

Application filed August 21, 1912.   Serial No. 716,144.

*To all whom it may concern:*

Be it know that I, EDWARD P. DOYLE, a citizen of the United States, residing at Wheaton, in the county of Dupage and State of Illinois, have invented a certain new and useful Improvement in Coupling Devices for Vehicles, of which the following is a specification.

This invention relates to car coupling devices particularly adapted for use in connection with electrically operated cars or vehicles, and has for its object to provide a new and improved device of this description.

The invention is illustrated in the accompanying drawings, wherein:

Figure 1 is a side view with parts broken away showing one form of coupling or connecting device embodying the invention; Fig. 2 is a sectional view taken on the line 2—2 of Fig. 1; Fig. 3 is an enlarged sectional view of one of the electrical connector elements in part section, in its operative position; Fig. 4 is a front view of one of the electrical connector elements; Fig. 5 is a plan view of the device shown in Fig. 1; Fig. 6 is a view in part section showing a modified construction to be used with any of the usual mechanical couplers; Fig. 7 is a sectional view taken on the line 7—7 of Fig. 6; Fig. 8 is a sectional view taken on the line 8—8 of Fig. 6; Fig. 9 is a front view taken on the line 9—9 of Fig. 6; Fig. 10 is a sectional view taken on the line 10—10 of Fig. 6; Fig. 11 is a view showing an inclosing or protecting device for the electrical contacts of the electrical coupler element of Fig. 6; Fig. 12 is a view of the device shown in Fig. 11 with the door open; Fig. 13 is a view of the end of the rod which moves the electrical connector.

Like numerals refer to like parts throughout the several figures.

As illustrated in Fig. 1 I have shown one form of my invention. In this construction each car or vehicle is provided with the mechanical coupler heads 1 by means of which vehicles are mechanically connected together. These coupler heads 1 are preferably arranged so as to make the air connection between the vehicles. Any suitable arrangement for this purpose may be used.

In the particular construction illustrated in Fig. 1 the coupler heads have connected thereto the air pipes 2 provided with the valves 2ª. The engaging faces of the coupler heads are provided with openings 3 with which these pipes communicate, arranged so that when these faces are brought together the openings register and a tight connection is made between the air pipes of the two coupler heads. This connection is arranged so that it is made automatically.

In the construction shown in Fig. 1 each coupler head is provided with an interlocking part 4 with a locking piece 5 mounted upon the pivot 6. The interlocking piece is provided with the recess 7 into which the locking piece 5 is received when the parts are in their coupled position. The locking part 5 has connected therewith an arm 8 provided with the spring 9 said arm being controlled by the lever 10. As the interlocking pieces 4 move into their operative position they strike the locking parts 5 and move them back thus compressing the spring 9. When the locking parts have moved to their interlocking position the receiving opening 7 is opposite the locking parts and said locking parts are then forced into the receiving openings by the spring 9 thereby holding the coupler heads in their locking position. The locking parts 5 are removed from the recess 7 by means of the lever 10.

Associated with the coupler heads are the electrical coupling devices for automatically making the electrical connections between the cars or vehicles. As illustrated in Figs. 1 to 4 each mechanical coupler head has connected therewith an electrical coupler head consisting of a frame 11 provided with a cylinder 12. An air connection 13 leads from one of the air pipes 2 to the cylinder 12. Within the cylinder 12 is a piston 14 having a piston rod which projects therefrom and which carries at its end the electrical connector element 15. This electrical connector element is provided on one side with the pins or plugs 16 and on the other side with the sockets 17. When two connector elements are brought together the pins of one element enter the sockets of the other element thus making the electrical connection. This arrangement insures the proper connection of the two elements when the cars are brought together. The electrical connectors are connected with the pins 16 and sockets 17. The parts are arranged so that when the mechanical coupling is made the electrical connector elements are brought into proper alinement and are then automatically brought into connection such connector elements having a movement relative to the movement of the cars to be coupled and to the mechanical coupler heads. In the construction illustrated in Fig. 1 the mechanical coupler heads when brought together make the air connections and the air then passing into cylinder 12 acts upon the piston 14 and the electrical connector elements are automatically moved out into electrical connection. The spring 18 moves the electrical connector element back to its initial position when the mechanical coupler heads are disconnected. Some suitable means is provided for protecting the electrical connector elements from the weather so as to prevent corrosion of the contacts and short circuiting thereof.

As illustrated in Figs. 1 to 3 the electrical connector elements are normally contained within an inclosing device 19 provided with the doors 20 and 21 normally closed as shown in Fig. 2. When the connector element is moved outwardly the door-engaging parts 22 and 23 engage said doors and move them out of the way as shown in Fig. 3. These doors are provided with closing springs 24. When the two electrical connector elements engage, the door-engaging part 22 of one element enters the receiving opening 25 of the other element and the door-engaging part 23 of one element enters the receiving space 26 of the other element, see Fig. 4. These elements are also provided at the top and bottom with the guide-ways 27 which engage suitable guides associated with the inclosing device 19. When the mechanical coupler heads are disconnected and the electrical connector elements move back into the inclosing device 19 the doors 20 and 21 are automatically closed. The door 21 is provided with an overlapping piece 28. In order that the door 20 may close slightly before the door 21 so as to bring the overlapping piece 28 on the outside the door-engaging piece 22 is made longer than the door-engaging piece 23. By this means the door 21 is made to close somewhat slower than the door 20.

My device may be used in connection with any form of ordinary mechanical coupler. I have illustrated one construction of this description in Figs. 6 to 10 inclusive. In this construction any ordinary mechanical coupler head 30 may be used. Connected with this coupler head is the frame 11 carrying the cylinder 12 in which operates the piston 14 which moves the electrical connector element 15. In this construction the air connection is made by the electrical connector element which makes the electrical connection. This electrical connector element in addition to being provided with the pins or plugs 16 and the sockets 17 is provided with the openings 31 with which the air pipes 32 are connected. The frame 11 is preferably provided with passageways 33 which form part of the air pipes 32. A pipe 34 is connected with one of the air pipes 32 and is provided with a valve 35. This valve is controlled by a push bar or controlling member 36 mounted upon the frame 11 and provided with an engaging end 37 which projects in front of the connector element 15, and which is engaged by a similar device on the other car during the process of coupling. This controlling member is provided with the spring 38 which is compressed while the cars are coupled together and which moves the member to its initial position when the cars are uncoupled. This member 36 is connected to the valve 35 in any desired manner as by means of the slot 39 and a crank 40 as illustrated in Fig. 6, this slot is shaped like a bell crank lever, that is, elongated at its lower end so as to give the member 36 a certain amount of play. The pipe 34 connects by means of a passageway 41 with the cylinder 12 and by means of the passageway 42 with the auxiliary cylinder 43. Located between the valve 35 and the cylinder 12 is a check valve 40$^a$ arranged to automatically close the connection to the cylinder 12 when the pressure falls below a predetermined amount. This valve is made adjustable by means of the spring 41$^a$ and the nut 41$^b$. This auxiliary cylinder is provided with the piston 44 and a piston rod 45 and a retracting spring 46. The rod 45 is connected by means of the crank 47 with the valves 48 in the air pipes 32, see Fig. 7, so that when the air enters the cylinder 43 back of the piston 44 the valves in the air pipe will be opened. These valves are closed by the retracting spring 46 and the air pressure in the cylinder is released. This air pressure may be released by means of the valve 49 controlled by the handle 50.

The connecting together of the mechanical coupler heads 30 brings the electrical connector elements in substantial alinement. If, however, these coupler heads are not properly alined by this mechanical coupler connection means is provided for bringing them into proper alinement so that the pins will be opposite the sockets so that they will properly enter therein.

In the particular construction shown each electrical connector element is provided with a centering opening having the beveled faces 51 into which enters a centering projection 52, see Figs. 6 and 10; the part 52 in Fig. 6 is attached to the opposed electrical connector and is shown in this figure to illustrate the method of centering. This construction secures vertical alinement. Horizontal alinement is secured by means of the inclined guide 53 on each element. As the connector elements move toward each other these several inclined faces insure the proper alinement of the parts so that the pins will enter the sockets.

When an ordinary mechanical coupling device is used there is a certain amount of play back and forth between the cars and the coupler heads. It is necessary that the opposed electrical connector elements be kept into firm contact with each other so as to insure the proper electrical connection and so as to make an air-tight connection between the air pipes. These connector elements are provided with gaskets 54 extending entirely therearound and around the openings 31 so that this air-tight connection may be secured and the pressure of the air on the pistons 14 keep these gaskets in contact so as to insure the air-tight connection. This play back and forth, however, tends to loosen this connection due to the fact that the air in the cylinder 12 does not respond with sufficient rapidity. In order, therefore, to keep the two connector elements together and to compensate for this back and forth movement I connect the connector elements with the rod 55 attached to the piston 14 so that there is a certain amount of play. This result is secured in the particular construction shown by providing the rod 55 with a slot of sufficient length to take up this motion said rod being connected to the connector element by means of a pin 56 which passes therethrough and through the lugs 57 on the connector elements. In order to keep the connector elements together and yet permit this movement of the mechanical coupler heads a spring 58 in interposed between the connector element 15 and a part on the frame 11. It will be seen that by means of this construction when the back and forth movement occurs the spring being under compression is instantly responsive and, while it permits the frame 11 and the cylinders to move back and forth, holds the connector elements 15 in proper contact until the air pressure can act to move the piston so that the air pressure again becomes effective to press the connector elements together. A communication extends from one of the pipes 32 below the valve 48, to the pipe 34. As herein shown there is a passage 59 communicating with the pipe 32 and with a pipe or connection 60, pipe 60 communicating by means of the passageway 61 with the pipe 34. A check valve 62 is located in this connection said check valve permitting the air to pass from pipe 32 to pipe 34 but preventing the movement of the air in the opposite direction. This construction enters into play when a motor car is coupled with an ordinary car. Every motor car has a pump and a source of air supply upon it while the ordinary car does not have a source of air supply. When an ordinary car, therefore, is coupled with a motor car the air passes from the motor car through the pipe 32 and thence through passageway 59, pipe 60 and passageway 61 into pipe 34 and thence to cylinders 12 and 43. The passage of the air in the other direction is prevented by the check valve 62. When two motor cars are coupled together both of them are provided with air and the air for the cylinders 12 and 43 of both couplings passes down from the top through pipe 32 and valve 35 to pipe 34. In cars of this description the air is used to actuate the brakes and these brakes are set by permitting the air to escape from the train pipes 32. If now, two cars should become uncoupled, it is desirable that the brakes shall at once act to stop both cars. When the cars are separated the ends of the pipes 32 are opened and hence, if the valves 48 are held open the air can escape and the brakes will be set. In the construction shown in Fig. 6 this result is secured by means of the valve 40ª. When the ends of the pipe are opened the air pressure decreases and the valve 40ª moves to the position shown in Fig. 6 so as to close off the passageway 41 and hold sufficient pressure in the cylinder 43 to hold the valves 48 open. The air will then become exhausted from the train pipes and the brakes will be set in the usual manner. When a train of cars, for example, is standing in the yard the air pressure will not be kept up. When this pressure falls a predetermined amount the valve 40ª moves to close off the connection 41, thus holding sufficient pressure in the cylinders 12 and 43 to keep the electrical coupler elements in contact.

When a motor car is ready to be coupled the ends of the pipes 32 in the construction of Fig. 6 are open and hence if, when the pump is first started up the air could enter the cylinders 43, the valves 48 would be open so that it will be impossible to get enough pressure to actuate the electrical coupling device. In the construction of Fig. 6 the valve 40ª prevents this as it will not open while the pump is bringing up the pressure and hence the valves 48 will be closed during that period but will only open when there is sufficient pressure to actuate the piston. These coupler elements 15 each have sufficient movement, that is, the stroke of the piston 14 is sufficient to make an electrical coupling when only one of the devices is moved so that when a motor car is coupled with an ordinary car the air on the motor car will actuate the electrical coupler element 15 on that car so as to move it into contact with the electrical coupler element of the other car and make the electrical and air connection.

It is desirable that the valve 48 will not be opened until the air connection is made. This result may be secured by arranging the piston 44 in cylinder 43 so that it requires a greater pressure to move it than is required to move piston 14 of cylinder 12. Any desired arrangement for this purpose may be used as, for example, by compressing the spring 46 by means of the adjusting device 63 so that the air entering the cylinder 12 first moves the piston 14, the movement of this piston preventing the power from increasing a sufficient amount to move the piston 44. This construction provides means for delaying the movement of the piston in the second cylinder until the piston connected with the electrical coupler element has moved a predetermined amount, whereupon there is an increase of pressure which causes the movement of the piston 44. The parts are preferably adjusted so that a sufficient increase in pressure does not occur until the air connection is made. The check valve 62 may be moved when the valve 40ª is arranged to also act as a check valve as said valve prevents the backward movement of the air.

In Figs. 11 and 12 I have shown a form of cover or protecting device for the electrical contacts of the electrical coupler element 15 of Fig. 6. In this construction the electrical contacts are normally covered and protected by means of a door 64 mounted upon a hinge 65. This door is provided with an arm 66 having a projection 67. The hinge 65 is provided with a suitable retracting spring 68. Attached to said element is a latch 69 adapted to engage the projection 67 as shown in Fig. 12 and hold the door open. A spring 70 normally acts to hold the latch in engagement with the projection. When the door 64 is open it may be used to perform the function of the guide 53 shown in Fig. 10. In making the electrical coupling the door 64 is opened by hand and latched as shown in Fig. 12. When the electrical coupling is made the pressure of the air in cylinder 12 moves the spring 58 forward so as to compress and said spring engaging the latch 69 moves it so as to release it. The door 64 is then held open by contact with the adjacent electrical coupler element. When the two electrical coupler elements are uncoupled the door 64 of each automatically closes.

Referring to Figs. 3 and 4 I prefer to make the openings 25 and 26 with beveled faces as indicated so that if there is any wear in the guides the parts 23 and 22 entering said beveled faces will properly center the electrical connection.

In order that the face of the door 64 may be made smooth so as to act as a guide I prefer to make holes 71 in said door for the contact pins on the electrical coupler element.

I claim:

1. A coupling device for vehicles, comprising a mechanical coupler for mechanically connecting the vehicles together, an electrical coupler for electrically coupling said vehicles, said electrical coupler having two parts, one connected with each vehicle and movable longitudinally relative thereto, and means for automatically actuating said electrical coupler parts to move them relatively to their coupling position, said means set in operation by the movement of said vehicles, the power for actuating said means being independent of the movement of said vehicles, said mechanical coupler keeping the parts of the electrical coupler from separating.

2. A coupling device for vehicles comprising a mechanical coupler for mechanically connecting the vehicles together, an electrical coupler attached to said mechanical coupler and supported thereby for electrically connecting the vehicles and a pneumatic actuating device for operating said electrical coupler.

3. A coupling device for vehicles comprising a mechanical coupler for mechanically connecting the vehicles together, an electrical coupler connected therewith for electrically connecting the vehicles and means for automatically actuating said electrical coupler after the mechanical coupling has been made.

4. A coupling device for vehicles comprising a mechanical coupler having a coupler head on each vehicle, an electrical coupler associated therewith having an electrical coupler element on each vehicle and means deriving its power from a source independent of the relative movement of said vehicles for automatically moving said electrical coupler elements relative to the vehicles to electrically connect them, said mechanical coupler holding said electrical coupler elements from separating.

5. A coupling device for vehicles comprising a mechanical coupler having a coupler head associated with each vehicle, an electrical coupler having an electrical coupler element associated with each vehicle, means for mechanically connecting the coupler heads of the mechanical coupler to connect the vehicles together and means started by the movement of the vehicles and acting independent of the movement thereof for automatically moving the electrical coupler elements into contact after the vehicles have been mechanically coupled together.

6. A coupling device for vehicles comprising a mechanical coupler having a coupler head associated with each vehicle, an electrical coupler connected therewith having an electrical element associated with each vehicle and a pneumatic actuating apparatus for moving said electrical coupler elements into contact, said mechanical coupler holding said electrical coupler elements from separating.

7. An electrical coupling device for electrically connecting vehicles together, air connections on the vehicles, an air coupling device for coupling said air connection between the two vehicles, a pneumatic device for actuating said electrical coupling, said pneumatic device operated by air from said air connections and a pneumatically actuated device for controlling said air connection.

8. A coupling device for vehicles comprising an electrical coupler having an electrical coupler element associated with each vehicle, an air actuated device for moving each electrical coupler element, air pipes associated with said coupling device on each vehicle coupled together when the coupling is made, valves in said air pipes and means for automatically opening said valves when the coupling is made to connect the air pipes together and to admit air to said air actuated device.

9. A coupling device for vehicles comprising an electrical coupler and an air coupler, a pneumatic device for automatically actuating the electrical coupling when the air coupler is coupled and a pneumatically controlled device for opening the air connection between the vehicles.

10. A coupling device for vehicles comprising an electrical coupler having an electrical coupler element associated with each vehicle, an air connection associated with each electrical coupler element and actuating devices started by the movement of the vehicles and acting independent of the movement thereof for moving said electrical coupler elements into contact.

11. A coupling device for vehicles comprising an electrical coupler having an electrical coupler element associated with each vehicle, and means on the vehicles started by the movement of the vehicles and acting independent of the movement thereof for moving said electrical coupler elements relatively so as to connect them together and complete the electrical connection between the vehicles.

12. A coupling device for vehicles comprising a mechanical coupler having a coupler head associated with each vehicle, an electrical coupler having an electrical coupler element associated with each vehicle, pneumatic devices for actuating said electrical coupler elements, said pneumatic devices holding said elements in proper connection and means associated with said electrical coupler elements for automatically preventing movement in the electrical coupler corresponding to the back and forth movement in the mechanical coupler.

13. A coupling device for vehicles comprising an electrical coupler having an electrical coupler element associated with each vehicle, means for moving said electrical coupler elements relative to said vehicle to make the electrical connection, air pipes on the vehicles adapted to be connected together, valves in said air pipes and an automatic device for opening and closing said valves.

14. A coupling device for vehicles comprising an electrical coupler having an electrical coupler element associated with each vehicle, means for moving said electrical coupler elements relatively to make the electrical connection, air pipes on the vehicles adapted to be connected together, valves in said air pipes, automatic devices actuated by coupling the coupler, for opening and closing said valves, and means associated with said automatic devices for holding the valves open when the vehicles are uncoupled so as to open the air pipes.

15. A coupling device for vehicles comprising an electrical coupler having an electrical coupling element associated with each vehicle, pneumatic actuating devices actuated by coupling the coupler for said electrical coupler elements, air pipes on said vehicles and means for connecting said air pipes with said pneumatic actuating devices.

16. A coupling device for vehicles comprising an electrical coupler element carried thereby, a cylinder, a piston therein connected with said electrical coupler element, and means for admitting air into said cylinder to move the coupler element.

17. A coupling device for vehicles comprising an electrical coupler element, a cylinder, a piston therein connected with said electrical coupler element, and means for admitting air into said cylinder to move the coupler element, a controlling device associated with said cylinder for automatically closing the air connection thereto when the pressure falls below a predetermined amount.

18. A coupling device for vehicles comprising an electrical coupler element, a cylinder, a piston therein connected with said electrical coupler element, an air pipe associated with said coupling device, a valve therein, a second cylinder, a piston therein connected with said air valve so as to open and close it when the piston is moved, and means for admitting air from said air pipe to said cylinders.

19. A coupling device for vehicles comprising an electrical coupler element, a cylinder, a piston therein connected with said electrical coupler element, an air pipe on each vehicle, said air pipes adapted to be connected together when the coupling is made, a valve therein, a second cylinder, a piston therein connected with said air valve so as to open and close it when the piston is moved, means for admitting air from said air pipe to said cylinders and means for delaying the movement of the piston in said second cylinder until the piston connected with the electrical coupler element has been moved a predetermined amount.

In testimony whereof, I affix my signature in the presence of two witnesses this 10th day of August, 1912.

EDWARD P. DOYLE.

Witnesses:
MINNIE M. LINDENAY,
LULU JORDAN.